(12) United States Patent
Jeong et al.

(10) Patent No.: US 9,214,856 B2
(45) Date of Patent: Dec. 15, 2015

(54) POWER FACTOR CORRECTION DEVICE

(71) Applicant: SAMSUNG ELECTRO-MECHANICS CO., LTD., Suwon, Gyunggi-do (KR)

(72) Inventors: In Wha Jeong, Gyunggi-do (KR); Bum Seok Suh, Gyunggi-do (KR); Min Gyu Park, Gyunggi-do (KR)

(73) Assignee: SAMSUNG ELECTRO-MECHANICS CO., LTD., Suwon-Si, Gyeonggi-Do (KR)

( * ) Notice: Subject to any disclaimer, the term of this patent is extended or adjusted under 35 U.S.C. 154(b) by 124 days.

(21) Appl. No.: 13/840,639

(22) Filed: Mar. 15, 2013

(65) Prior Publication Data
US 2014/0153299 A1 Jun. 5, 2014

(30) Foreign Application Priority Data

Dec. 5, 2012 (KR) .................. 10-2012-0140170

(51) Int. Cl.
H02M 1/12 (2006.01)
H02M 1/42 (2007.01)
H02M 1/00 (2007.01)

(52) U.S. Cl.
CPC .......... H02M 1/4233 (2013.01); H02M 1/4225 (2013.01); H02M 2001/0058 (2013.01); Y02B 70/126 (2013.01); Y02B 70/1491 (2013.01)

(58) Field of Classification Search
CPC ... H02M 1/12; H02M 1/4208; H02M 1/4225; H02M 1/14; H02M 1/15; H02M 1/126; H02M 1/4266; H02M 1/32; H02M 7/06; H02M 7/068; H02M 7/219; H02M 7/10; H02M 3/33592; H02M 3/157; H02M 3/1584
USPC .................. 363/44, 45, 47, 48, 125–127, 89; 323/205, 207, 209
See application file for complete search history.

(56) References Cited

U.S. PATENT DOCUMENTS 7,215,560 B2* 5/2007 Soldano et al. ............... 363/44
8,289,737 B2* 10/2012 Wildash .......................... 363/44
(Continued)

FOREIGN PATENT DOCUMENTS

CN 102055355 A 5/2011
JP 06-311738 A 11/1994
(Continued)

OTHER PUBLICATIONS

State Intellectual Property Office of the People's Republic of China (SIPO). 2015. Notification of First Office Action, dated Sep. 29, 2015, for Chinese Application No. 2013101164818, Chinese counterpart to instant application, entitled "Power Factor Correction Device," Samsung Electro-Mechanics Co., Ltd., Applicant.

Primary Examiner — Gary L Laxton
Assistant Examiner — Kevin H Sprenger
(74) Attorney, Agent, or Firm — McDermott Will & Emery LLP

(57) ABSTRACT

There is provided a power factor correction device including: a main switching unit including a first main switch and a second main switch performing a switching operation with predetermined phase differences; an auxiliary switching unit including a first auxiliary switch and a second auxiliary switch forming a transmission path for surplus power existing before the first main switch and the second main switch are turned on, respectively; an inductor unit positioned between a power input unit to which AC power is applied and the main switching unit and accumulating or discharging energy according to a switching operation of the main switching unit; and an auxiliary inductor unit regulating an amount of current flowing in the auxiliary switching unit in the event of a switching operation of the auxiliary switching unit.

16 Claims, 7 Drawing Sheets

(56) References Cited

U.S. PATENT DOCUMENTS

| | | | |
|---|---|---|---|
| 8,432,710 B2* | 4/2013 | Yamada | 363/44 |
| 2008/0002444 A1* | 1/2008 | Shekhawat et al. | 363/127 |
| 2012/0092900 A1* | 4/2012 | Orr | 363/21.03 |
| 2012/0139505 A1* | 6/2012 | Ren et al. | 323/207 |
| 2013/0235631 A1* | 9/2013 | Pahlevaninezhad et al. | 363/126 |

FOREIGN PATENT DOCUMENTS

| | | |
|---|---|---|
| KR | 10-2002-0074245 A | 9/2002 |
| WO | WO 2006/105247 A2 | 10/2006 |

* cited by examiner

POWER FACTOR CORRECTION DEVICE

CROSS-REFERENCE TO RELATED APPLICATIONS

This application claims the priority of Korean Patent Application No. 10-2012-0140170 filed on Dec. 5, 2012, in the Korean Intellectual Property Office, the disclosure of which is incorporated herein by reference.

BACKGROUND OF THE INVENTION

1. Field of the Invention

The present invention relates to a bridgeless power factor correction device capable of reducing switching loss.

2. Description of the Related Art

Recently, national governments around the world have urged the effective use of energy in conformity with energy efficiency policies, and in particular, effective use of energy in electronic products or home appliances is widely recommended.

Thus, according to such recommendations, a remedial circuit for effectively using energy has been applied to power supply devices supplying power to electronic products, home appliances, and the like.

The remedial circuit may be, for example, a power factor correction circuit. A power factor correction circuit is a circuit for switching input power to adjust a phase difference (power factor) between a current and a voltage of the input power to effectively transfer power to a rear stage.

In general, a power factor correction circuit may be classified as a passive type power factor correction circuit and an active type power factor correction circuit.

A passive type power factor correction circuit employs a method for correcting a power factor with an inductor or a capacitor, and in particular, it is known to have a limitation in power factor correction in a single phase.

An active type power factor correction circuit employs a method of correcting a power factor by performing switching by a combination of an inductor and a switching element by using a boost type topology. However, the active type power factor correction circuit has relatively low efficiency, a high internal current, voltage ripples, electromagnetic interference (EMI) noise, and the like, and thus, its application to a middle or large-scale power source device is not easy.

In particular, in the case of the power factor correction circuit, switching loss is generated in the process of switching input power.

Patent document 1 below relates to a bridgeless boost converter having a power factor correction (PFC) circuit, which, however, does not disclose a configuration for improving switching efficiency in power conversion.

RELATED ART DOCUMENT (Patent document 1) Korean Patent Laid Open Publication No. 2007-0116240

SUMMARY OF THE INVENTION

An aspect of the present invention provides a power factor correction device in which surplus power is delivered to a ground before performing switching for power factor correction, to thus reduce switching loss generated in the event of power factor correction switching.

Another aspect of the present invention provides a power factor correction device for reducing an electromagnetic interference (EMI) noise level.

According to an aspect of the present invention, there is provided a power factor correction device including: a main switching unit including a first main switch and a second main switch performing a switching operation with predetermined phase differences; an auxiliary switching unit including a first auxiliary switch and a second auxiliary switch forming a transmission path for surplus power existing before the first main switch and the second main switch are turned on, respectively; an inductor unit positioned between a power input unit to which AC power is applied and the main switching unit and accumulating or discharging energy according to a switching operation of the main switching unit; and an auxiliary inductor unit regulating an amount of current flowing in the auxiliary switching unit in the event of a switching operation of the auxiliary switching unit.

The first auxiliary switch may perform a first switching operation of being turned on before the first main switch is turned on, and turned off before the first main switch is turned off.

The second auxiliary switch may perform a second switching operation of being turned on before the second main switch is turned on, and turned off before the second main switch is turned off.

The first main switch and the second main switch of the main switch may be switched with an input phase difference of 180°.

The power input unit may include a first input line as one end thereof and a second input line as the other end thereof, and the inductor unit may include a first inductor connected between the first input line and the first main switch and a second inductor connected between the second input line and the second main switch.

The auxiliary inductor unit may include a first auxiliary inductor disposed between the first main switch and the first auxiliary switch and a second auxiliary inductor disposed between the second main switch and the second auxiliary switch.

The power factor correction device may further include a first reverse current preventing diode connected to the first main switch in parallel and a second reverse current preventing diode connected to the second main switch in parallel.

The power factor correction device may further include a diode unit providing a transmission path for power discharged from the inductor unit according to a switching operation of the main switching unit.

The diode unit may include a first diode providing a transmission path for power discharged from the first inductor according to a switching operation of the first main switch and a second diode providing a transmission path for power discharged from the second inductor according to a switching operation of the second main switch.

The power factor correction device may further include: a controller outputting control signals for controlling switching operations of the main switching unit and the auxiliary switching unit.

According to another aspect of the present invention, there is provided a power factor correction device having a first output line and a second output line to which a load is applied, including: a power input unit generating AC power; a first inductor and a second inductor connected to a first input line as one end of the power input unit and a second input line as the other end of the power input unit, respectively; a first diode disposed between the first inductor and the first output line; a second diode disposed between the second inductor and the first output line; a first main switch disposed between the first inductor and the second output line; a second main switch disposed between the second inductor and the second output line; a first auxiliary switch connected to the first main switch in parallel; a first auxiliary inductor connected to the first main switch in parallel and connected to the first auxiliary switch in series; a second auxiliary switch connected to the second main switch in parallel; and a second auxiliary inductor connected to the second main switch in parallel and connected to the second auxiliary switch in series.

The first auxiliary switch may perform a first switching operation of being turned on before the first main switch is turned on, and turned off before the first main switch is turned off.

The second auxiliary switch may perform a second switching operation of being turned on before the second main switch is turned on, and turned off before the second main switch is turned off.

The first diode and the second diode may be fast recovery diodes.

The first switch and the second switch may include one of an insulated gate bipolar transistor (IGBT), a metal oxide semiconductor field-effect transistor (MOS-FET), and a bipolar junction transistor (BJT), respectively.

According to another aspect of the present invention, there is provided a power factor correction device including: a main switching unit switching AC power from a power input unit to regulate a phase difference between a current and a voltage of the AC power; an auxiliary switching unit switched on before the main switching unit is switched on, to form a transmission path for surplus power of the main switching unit; an inductor unit accumulating or discharging energy according to a switching operation of the main switching unit; and an auxiliary inductor unit regulating an amount of current flowing in the auxiliary switching unit according to a switching operation of the auxiliary switching unit.

The main switching unit may include: a first main switch regulating a phase difference between a current and a voltage of the AC power during a positive half cycle of the AC power; and a second main switch regulating a phase difference between a current and a voltage of the AC power during a negative half cycle of the AC power.

The auxiliary switch may include a first auxiliary switch and a second auxiliary switch forming a transmission path for surplus power existing before the first main switch and the second main switch are turned on, respectively.

The inductor unit may include: a first inductor connected between one end of the power input unit and the first main switch; and a second inductor connected between the other end of the power input unit and the second main switch.

The auxiliary inductor unit may include a first auxiliary inductor disposed between the first main switch and the first auxiliary switch and a second auxiliary inductor disposed between the second main switch and the second auxiliary switch.

The power factor correction device may further include a diode unit providing a transmission path for power discharged from the inductor unit according to a switching operation of the main switching unit.

The diode unit may include a first diode providing a transmission path for power discharged from the first inductor according to a switching operation of the first main switch and a second diode providing a transmission path for power discharged from the second inductor according to a switching operation of the second main switch.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
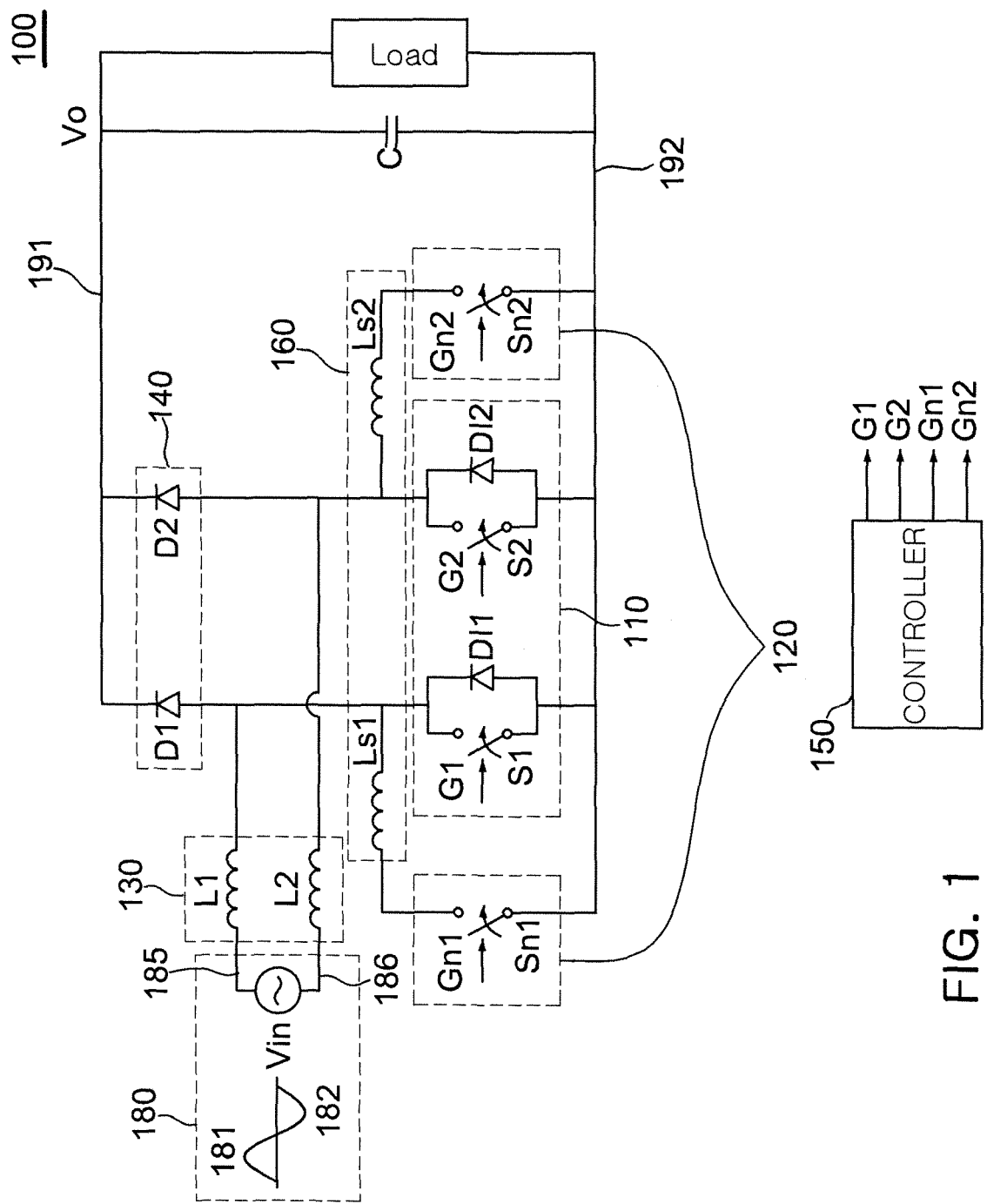
FIGS. 1 and 2 are circuit diagrams of a power factor correction device according to an embodiment of the present invention.

Embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of elements may be exaggerated for clarity, and the same reference numerals will be used throughout to designate the same or like components.

Figure 2:
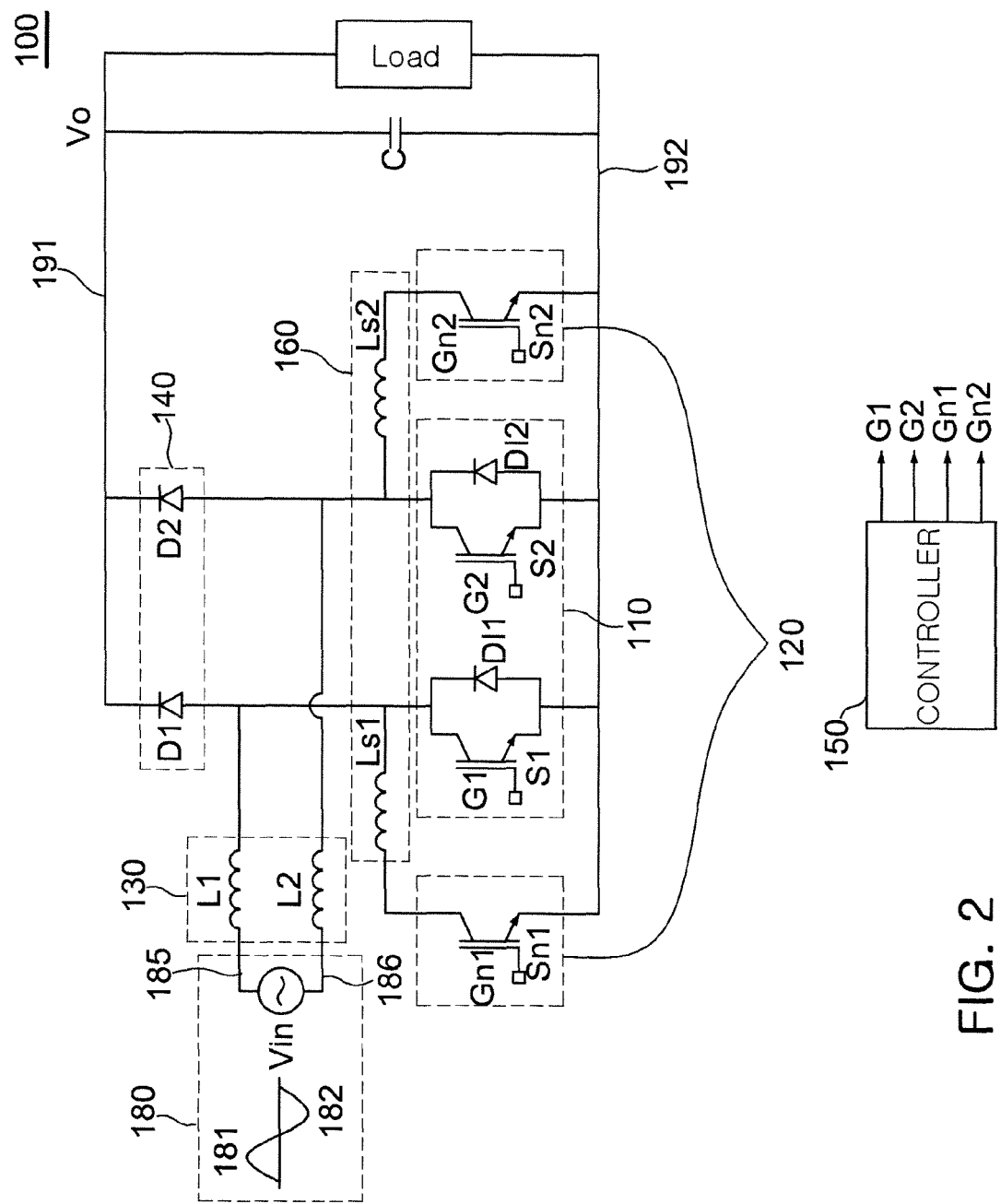

FIGS. 1 and 2 are circuit diagrams of a power factor correction device according to an embodiment of the present invention.

Referring to FIG. 1, a power factor correction device 100 may include a power input unit 180, a main switching unit 110, an auxiliary switching unit 120, an inductor unit 130, an auxiliary inductor unit 160, a diode unit 140, and a controller 150. Here, it will be defined that one end of the power input unit 180 is a first input line 185 and the other end thereof is a second input line 186. Also, it will be defined that one end by which the power factor correction device 100 is connected to a load is a first output line 191 and the other end by which the power factor correction device 100 is connected to the load is a second output line 192.

The main switching unit 110 may include a first main switch S1 and a second main switch S2 performing a switching operation with a predetermined phase difference to improve a power factor of input power. As illustrated in FIG. 1, the first main switch S1 may be disposed between a connection terminal between a first inductor L1 and a first diode D1 and the second output line 192. Also, the second main switch S2 may be disposed between a connection terminal between a second inductor L2 and a second diode D2 and the second output line 192.

Meanwhile, the first main switch S1 and the second main switch S2 may perform a switching operation with an input phase difference of 180° one another.

In this case, the input power may be power applied from the power input unit 180. Also, the power applied from the power input unit 180 may be AC power.

The main switching unit 110 may include a first reverse current preventing diode DI1 and a second reverse current preventing diode DI2. The first reverse current preventing diode DI1 may prevent a reverse current of the first main switch S1. The second reverse current preventing diode DI2 may prevent a reverse current of the second main switch S2.

The first reverse current preventing diode DI1 and the second reverse current preventing diode DI2 may be diodes formed in a body when the first main switch S1 and the second main switch S2 are configured as transistors, but the present invention is not limited thereto and the first reverse current preventing diode DI1 and the second reverse current preventing diode DI2 may be separately added diodes.

The inductor unit 130 may be connected between the power input unit 180 to which input power is applied and the main switching unit 110 to accumulate or discharge energy according to a switching operation of the main switching unit 110. In detail, the inductor unit 130 may include the first inductor L1 and the second inductor L2. The first inductor L1 may be connected between the first input line 185 and the first main switch S1. The second inductor L2 may be connected between the second input line 186 and the second main switch S2.

The diode unit 140 may provide a transmission path for power discharged from the inductor unit 130 according to a switching operation of the main switching unit 110. In detail, the diode unit 140 may include the first diode D1 and the second diode D2. The first diode D1 may be disposed between the first inductor L1 and the first output line 191. The second diode D2 may be disposed between the second inductor L2 and the first output line 191.

The first diode D1 may provide a transmission path for power discharged from the first inductor L1 according to a switching operation of the first main switch S1. Also, the second diode D2 may provide a transmission path for power discharged from the second inductor L2 according to a switching operation of the second main switch S2.

The first diode D1 and the second diode D2 are required to be synchronized with ON/OFF switching of the first main switch S1 and the second main switch S2 to provide an accurate conductive path, so, preferably, the first diode D1 and the second diode D2 are diodes having excellent characteristics. For example, the first diode D1 and the second diode D2 may include a fast recovery diode (FRD) having excellent reverse recovery characteristics.

A capacitor C may be connected to the output terminal in parallel to stabilize power output from the diode unit 140.

The auxiliary switching unit 120 may form a transmission path for surplus power before the main switching unit 110 performs an ON operation.

The auxiliary switching unit 120 may include a first auxiliary switch Sn1 and a second auxiliary switch Sn2. The first auxiliary switch Sn1 may be connected to the first main switch S1 in parallel. The second auxiliary switch Sn2 may be connected to the second main switch S2 in parallel.

The first auxiliary switch Sn1 may form a transmission path for surplus power existing before the first main switch S1 performs an ON operation. Also, the second auxiliary switch Sn2 may form a transmission path for surplus power existing before the second main switch S2 performs an ON operation.

The auxiliary inductor unit 160 may regulate an amount of current flowing in the auxiliary switching unit 120 in the event of a switching operation of the auxiliary switching unit 120.

The auxiliary inductor unit 160 may include a first auxiliary inductor Ls1 and a second auxiliary inductor Ls2. The first auxiliary inductor Ls1 may be connected to the first main switch S1 in parallel. Also, the first auxiliary inductor Ls1 may be connected to the first auxiliary switch Sn1 in series. Namely, the first auxiliary inductor Ls1 may be disposed between a connection terminal between the first main switch S1 and the first inductor L1 and the first auxiliary switch Sn1. Also, the second auxiliary inductor Ls2 may be connected to the second main switch S2 in parallel. The second auxiliary inductor Ls2 may be connected to the second auxiliary switch Sn2 in series. Namely, the second auxiliary inductor Ls2 may be disposed between a connection terminal between the second main switch S2 and the second inductor L2 and the second auxiliary switch Sn2.

The controller 150 may provide switching control signals G1, G2, Gn1, and Gn2 controlling switching operations of the first main switch S1, the second main switch S2, the first auxiliary switch Sn1, and the second auxiliary switch Sn2.

The first main switch S1, the second main switch S2, the first auxiliary switch Sn1, and the second auxiliary switch Sn2 may be configured as one of an insulated gate bipolar transistor (IGBT), a metal oxide semiconductor field-effect transistor (MOS-FET), and a bipolar junction transistor (BJT), respectively. Referring to FIG. 2, it is illustrated that the first main switch S1, the second main switch S2, the first auxiliary switch Sn1, and the second auxiliary switch Sn2 are configured as BJTs, but the present invention is not limited thereto.

The main switching unit 110 of the power factor correction device 100 may perform a switching operation to adjust a phase difference between a voltage and a current of input power, to thus improve a power factor. Here, the auxiliary switching unit 120 may form a transmission path for surplus power remaining when the switching operation of the main switching unit 110.

First, an operation of the bridgeless power factor correction device, excluding operations of the auxiliary switches Sn1 and Sn2, will be described. The operations of the auxiliary switches Sn1 and Sn2 will be described in detail with reference to FIGS. 4 through 7.

The power input unit 180 generates AC power as a positive half cycle 181 and a negative half cycle 182 are alternated iteratively. While the positive half cycle 181 is maintained, a current flows to the first inductor L1. Here, when the first main switch S1 is turned on, the current may be returned to the power input unit 180 through the first main switch S1, the second reverse current preventing diode DI2, and the second inductor L2. During this process, the first inductor L1 may be maintained in a charged state in which energy is increased. Meanwhile, when the first main switch S1 is turned off, the first inductor L1 is in a discharged state in which energy is reduced and a current may flow to a load through the first diode D1. In this manner, when the power input unit 180 is in the positive half cycle 181, conduction loss is only generated by the first switch S1, not by the second switch S2.

Next, while the negative half cycle 182 is maintained, the current flows through the second inductor L2. Here, when the second main switch S2 is turned on, the current may be returned to the power input unit 180 through the second main switch S2, the first reverse current preventing diode DI1, and the first inductor L1. During this process, the second inductor L2 may be maintained in the charged state in which energy is increased. Meanwhile, when the second main switch S2 is turned off, the second inductor L2 moves into a discharged state in which energy is reduced, and the current may flow to the load through the second diode D2. In this manner, when the power input unit 180 is in the negative half cycle 182, conductive loss is only generated by the second switch S2, not by the first switch S1.

Figure 3:
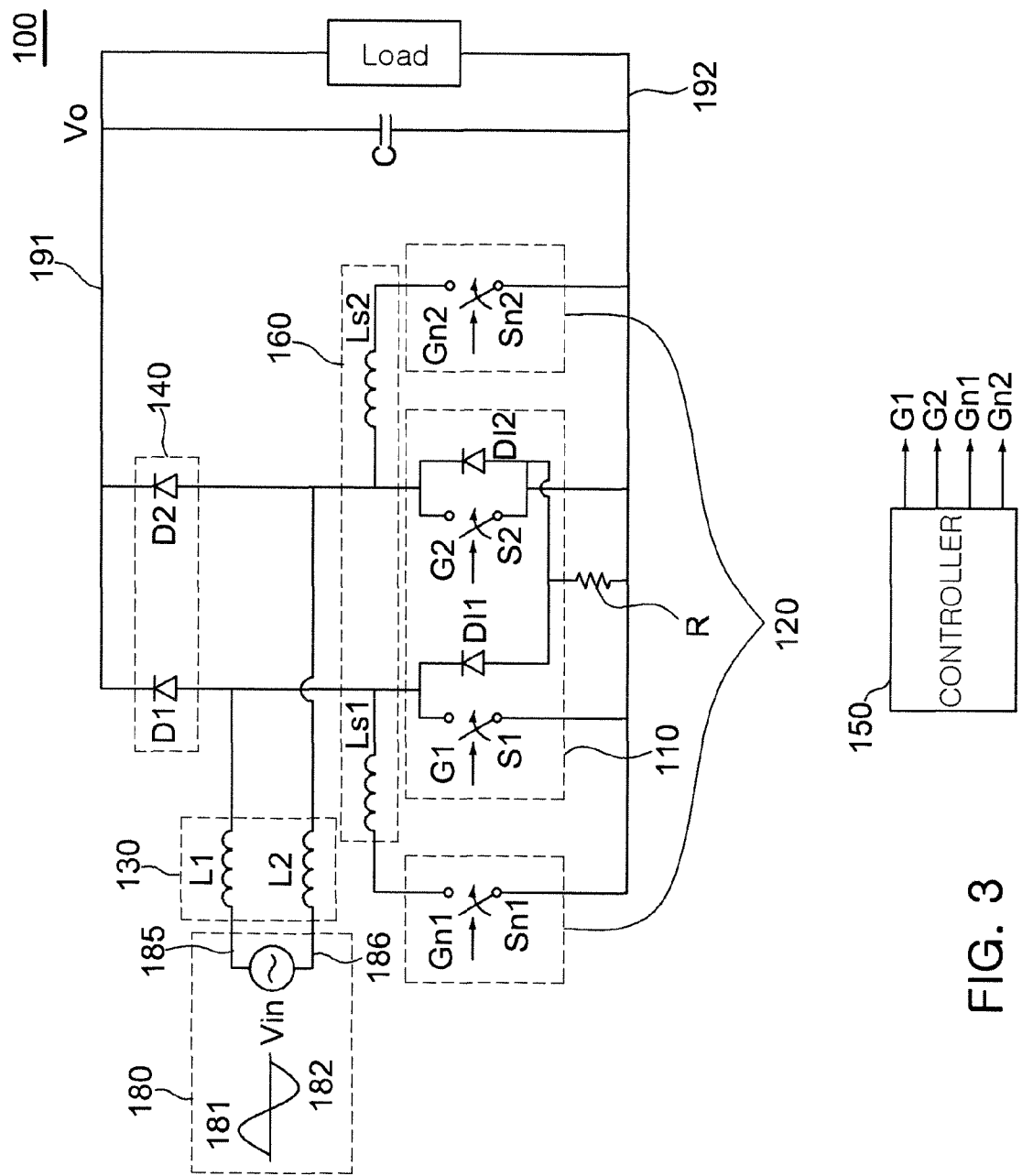
FIG. 3 is a circuit diagram of a power factor correction device according to another embodiment of the present invention.

FIG. 3 is a circuit diagram of a power factor correction device according to another embodiment of the present invention;

Referring to FIG. 3, the power factor correction device 100 may further include a resistor R for detecting an output current. In detail, one end of the resistor R may be connected to anodes of the first reverse current preventing diode DI1 and the second reverse current preventing diode DI2. Also, the other end of the resistor R may be connected to the second output line 192.

Elements other than the resistor R are the same as those illustrated in FIGS. 1 and 2, so a detailed description thereof will be omitted.

Figure 4:
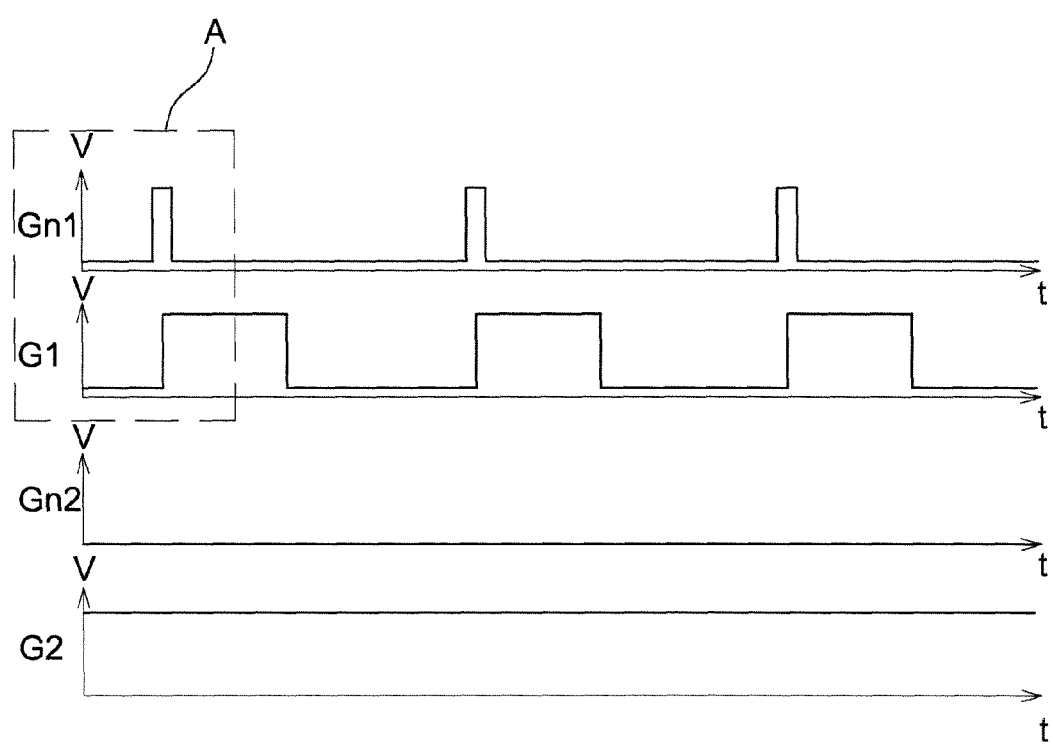
FIG. 4 is a graph showing switching control signals of a main switching unit and an auxiliary switching unit employed in a power factor correction device according to an embodiment of the present invention when a power input unit is in a positive half-cycle state.
Figure 5:
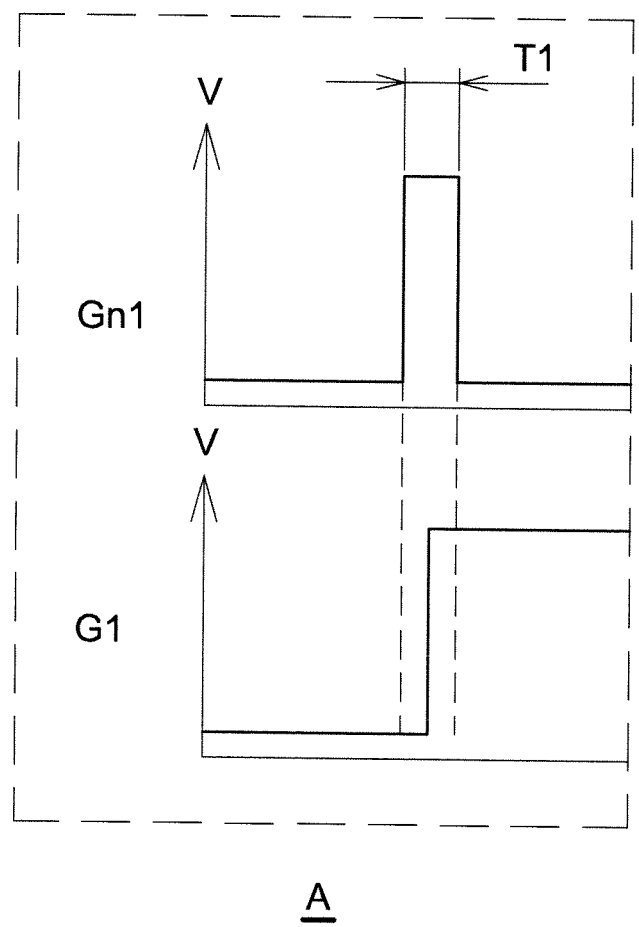
FIG. 5 is an enlarged view of a portion 'A' in FIG. 4.

FIG. 4 is a graph showing switching control signals of a main switching unit and an auxiliary switching unit employed in a power factor correction device according to an embodiment of the present invention when a power input unit is in a positive half-cycle state, and FIG. 5 is an enlarged view of a portion 'A' in FIG. 4.

Referring to FIGS. 1, 4, and 5, when the power input unit 180 is in the positive half cycle state 181, the controller 150 may apply the high level signal G2 to the second main switch S2. Also, the controller 150 may apply the low level signal Gn2 to the second auxiliary switch Sn2.

Namely, according to an embodiment of the present invention, when the power input unit 180 is in the positive half cycle state 181, the second main switch S2 may be in an ON state and the second auxiliary switch Sn2 may be in an OFF state.

Also, referring to FIGS. 1, 4, and 5, the auxiliary switching unit 120 of the power factor correction device 100 may form a transmission path for surplus power before an ON operation of the main switching unit 110 (i.e., before the main switching unit 110 is turned on). Namely, in other words, by providing zero voltage switching conditions of the main switching unit 110, switching loss may be removed.

In detail, in order to form a transmission path for surplus power, the controller 150 may transmit switching control signals G1 and Gn1 for turning on the first auxiliary switch Sn1 before an ON operation of the first switch S1. When the switching control signal is a high level signal, the respective switches S1 and Sn1 may be turned on, and when the switching control signal is a low level signal, the respective switches S1 and Sn1 may be turned off.

In detail, the first auxiliary switch Sn1 may form a transmission path for surplus power existing before the first main switch S1 is turned on.

To this end, as illustrated in FIGS. 4 and 5, the first auxiliary switch Sn1 may be turned on before the first main switch S1 is turned on, and may be turned off before the first main switch S1 is turned off. This may be called a first switching operation.

Meanwhile, although the first auxiliary switch Sn1 forms a transmission path for surplus power of the first main switch S1 to reduce switching loss of the first main switch S1, switching loss of the first auxiliary switch Sn1 may be generated.

In other words, at the timing of an OFF operation of the first auxiliary switch Sn1, a peak voltage according to transient power is generated from both ends of the first auxiliary switch Sn1 to potentially cause switching loss.

In order to solve the problem, referring to FIG. 1, the power factor correction device may further include the first auxiliary inductor Ls1 regulating an amount of current flowing in the first auxiliary switch Sn1 in the event of a switching operation of the first auxiliary switch Sn1.

Meanwhile, referring to FIG. 5, a width of the control signal Gn1 with respect to the first auxiliary switch Sn1 may be appropriately regulated.

For example, a pulse width T1 of the control signal Gn1 is required to generate zero voltage switching conditions in the first main switch S1.

Also, in case that a current flowing through the first diode D1 is increased, it is preferable for the pulse width T1 of the control signal Gn1 to be widened in order to reduce a spike voltage generated when the first auxiliary switch Sn1 is turned off. The reason is because, when the pulse width T1 of the control signal Gn1 is widened, a current flowing at the timing when the first auxiliary switch Sn1 is turned off can be reduced.

Also, in the case that inductance of the first auxiliary inductor Ls1 is increased, a reverse recovery current of the first diode D1 is reduced, so, it is preferable for the pulse width T1 of the control signal Gn1 to be reduced to allow the first main switch S1 to be zero-voltage switched within a short time.

Also, in case that switching frequencies of the control signals G1 and Gn1 are increased, it is preferable for the pulse width T1 of the control signal Gn1 to be reduced in order to prevent distortion of the control signals and reduce conduction loss of the first auxiliary switch Sn1 generated during a turn-on time of the first auxiliary switch Sn1.

According to an embodiment of the present invention as describe above, since the first main switch S1 operates under zero voltage switching conditions, switching loss of the first main switch S1 can be reduced, and thus, efficiency of the power factor correction device can be significantly enhanced.

Figure 6:
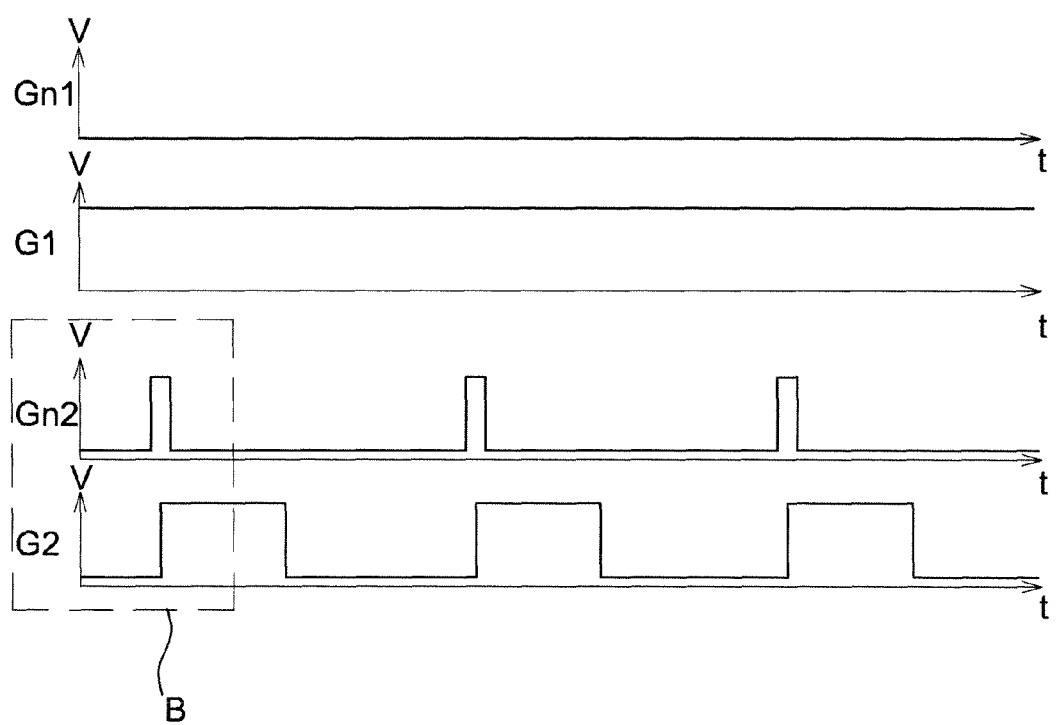
FIG. 6 is a graph showing switching control signals of the main switching unit and the auxiliary switching unit employed in the power factor correction device according to an embodiment of the present invention when a power input unit is in a negative half-cycle state.
Figure 7:
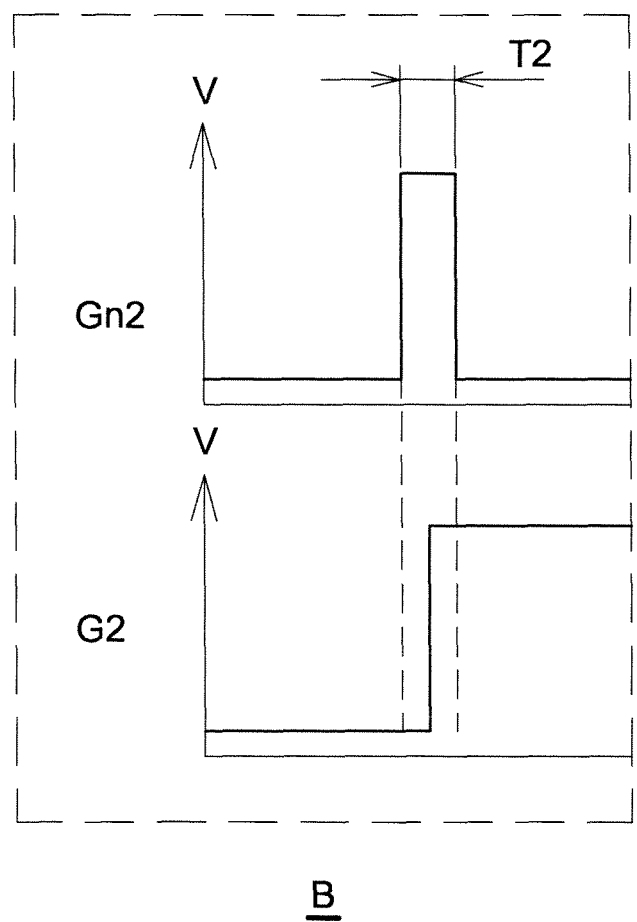
FIG. 7 is an enlarged view of a portion 'B' in FIG. 6.

FIG. 6 is a graph showing switching control signals of the main switching unit and the auxiliary switching unit employed in the power factor correction device according to an embodiment of the present invention when a power input unit is in a negative half-cycle state, and FIG. 7 is an enlarged view of a portion 'B' in FIG. 6.

Referring to FIGS. 1, 6, and 7, when the power input unit 180 is in the negative half cycle state 182, the controller 150 may apply the high level signal G1 to the first main switch S1. Also, the controller 150 may apply the low level signal Gn1 to the first auxiliary switch Sn1.

Namely, according to an embodiment of the present invention, when the power input unit 180 is in the negative half cycle state 182, the first main switch S1 may be in an ON state, while the first auxiliary switch Sn1 may be in an OFF state.

Also, referring to FIGS. 1, 6, and 7, the auxiliary switching unit 120 of the power factor correction device 100 may form a transmission path for surplus power before an ON operation of the main switching unit 110 (i.e., before the main switching unit 110 is turned on). Namely, in other words, by providing zero voltage switching conditions in the main switching unit 110, switching loss can be eliminated.

In detail, in order to form a transmission path for surplus power, the controller 150 may transfer switching control signals G2 and Gn2 for turning on the second auxiliary switch Sn2 before an ON operation of the second switch S2. When the switching control signal is a high level signal, the respective switches S2 and Sn2 may be turned on, and when the switching control signal is a low level signal, the respective switches S2 and Sn2 may be turned off.

In detail, the second auxiliary switch Sn2 may form a transmission path for surplus power existing before the second main switch S2 is turned on.

To this end, as illustrated in FIGS. 6 and 7, the second auxiliary switch Sn2 may be turned on before the second main switch S2 is turned on, and turned off before the main switch S2 is turned off. This may be called a second switching operation.

Meanwhile, although the second auxiliary switch Sn2 forms a transmission path for surplus power of the second main switch S2 to reduce switching loss of the second main switch S2, switching loss of the second auxiliary switch Sn2 may be generated.

In other words, at the timing of an OFF operation of the auxiliary switch Sn2, a peak voltage according to transient power may be generated from both ends of the second auxiliary switch Sn2 to potentially cause switching loss.

In order to solve the problem, referring to FIG. 1, the power factor correction device may further include the secondary auxiliary inductor Ls2 regulating an amount of current flowing in the second auxiliary switch Sn2 in the event of a switching operation of the second auxiliary switch Sn2.

Meanwhile, referring to FIG. 7, a width of the control signal Gn2 with respect to the second auxiliary switch Sn2 may be appropriately adjusted.

For example, a pulse width T2 of the control signal Gn2 is required to generate the zero voltage switching condition of the second main switch S2.

Also, in case that a current flowing through the second diode D2 is increased, it is preferable for the pulse width T2 of the control signal Gn2 to be widened in order to reduce a spike voltage generated when the second auxiliary switch Sn2 is turned off. The reason is because, when the pulse width T2 of the control signal Gn2 is widened, a current flowing at the timing when the second auxiliary switch Sn2 is turned off can be reduced.

Also, in case that inductance of the second auxiliary inductor Ls2 is increased, a reverse recovery current of the second diode D2 is reduced, so, it is preferable for the pulse width T2 of the control signal Gn2 to be reduced to allow the second main switch S2 to be zero-voltage switched within a short time.

Also, in case that switching frequencies of the control signals G2 and Gn2 are increased, it is preferable for the pulse width T2 of the control signal Gn2 to be reduced in order to prevent distortion of the control signals and reduce conduction loss of the second auxiliary switch Sn2 generated during a turn-on time of the second auxiliary switch Sn2.

According to an embodiment of the present invention as describe above, since the second main switch S2 operates under zero voltage switching conditions, switching loss of the second main switch S2 can be reduced, and thus, efficiency of the power factor correction device can be significantly enhanced.

As set forth above, according to embodiments of the invention, the power factor correction device capable of reducing switching loss generated in the occurrence of power factor correction switching by transferring surplus power to a ground before a switching operation is performed to correct a power factor can be provided.

Also, the power factor correction device capable of reducing an electromagnetic interference (EMI) noise level can be provided.

While the present invention has been shown and described in connection with the embodiments, it will be apparent to those skilled in the art that modifications and variations can be made without departing from the spirit and scope of the invention as defined by the appended claims.

What is claimed is:

1. A power factor correction device comprising:
   a main switching unit including a first main switch and a second main switch performing a switching operation with predetermined phase differences;
   an auxiliary switching unit including a first auxiliary switch and a second auxiliary switch forming a transmission path for surplus power existing before the first main switch and the second main switch are turned on, respectively;
   an inductor unit positioned between a power input unit to which AC power is applied and the main switching unit and accumulating or discharging energy according to a switching operation of the main switching unit; and
   an auxiliary inductor unit regulating an amount of current flowing in the auxiliary switching unit in the event of a switching operation of the auxiliary switching unit,
   wherein the first auxiliary switch performs a first switching operation of being turned on before the first main switch is turned on, and turned off before the first main switch is turned off, within a single switching period of the first main switch, and
   wherein the second auxiliary switch performs a first switching operation of being turned on before the second main switch is turned on, and turned off before the second main switch is turned off, within a single switching period of the second main switch.

2. The power factor correction device of claim 1, wherein the first main switch and the second main switch of the main switching unit are switched with an input phase difference of 180°.

3. The power factor correction device of claim 1, wherein the power input unit comprises a first input line and a second input line, and
   the inductor unit comprises a first inductor connected between the first input line and the first main switch and a second inductor connected between the second input line and the second main switch.

4. The power factor correction device of claim 3, wherein the auxiliary inductor unit comprises:
   a first auxiliary inductor disposed between a connection terminal between the first main switch and the first inductor and the first auxiliary switch; and
   a second auxiliary inductor disposed between a connection terminal between the second main switch and the second inductor and the second auxiliary switch.

5. The power factor correction device of claim 1, further comprising:
   a first reverse current preventing diode connected to the first main switch in parallel; and
   a second reverse current preventing diode connected to the second main switch in parallel.

6. The power factor correction device of claim 1, further comprising a diode unit providing a transmission path for power discharged from the inductor unit according to a switching operation of the main switching unit.

7. The power factor correction device of claim 6, wherein the diode unit comprises:
   a first diode providing a transmission path for power discharged from the first inductor according to a switching operation of the first main switch; and
   a second diode providing a transmission path for power discharged from the second inductor according to a switching operation of the second main switch.

8. The power factor correction device of claim 1, further comprising a controller outputting control signals for controlling switching operations of the main switching unit and the auxiliary switching unit.

9. A power factor correction device having a first output line and a second output line to which a load is applied, the device comprising:

a power input unit generating AC power;

a first inductor and a second inductor connected to a first input line of the power input unit and a second input line of the power input unit, respectively;

a first diode disposed between the first inductor and the first output line;

a second diode disposed between the second inductor and the first output line;

a first main switch disposed between a connection terminal between the first inductor and the first diode and the second output line;

a second main switch disposed between a connection terminal between the second inductor and the second diode and the second output line;

a first auxiliary switch connected to the first main switch in parallel;

a first auxiliary inductor connected to the first main switch in parallel and connected to the first auxiliary switch in series;

a second auxiliary switch connected to the second main switch in parallel; and a second auxiliary inductor connected to the second main switch in parallel and connected to the second auxiliary switch in series, wherein the first auxiliary switch and the second auxiliary switch form a transmission path for surplus power that exists before the first main switch and the second main switch are turned on, respectively, wherein the first auxiliary switch performs a first switching operation of being turned on before the first main switch is turned on, and turned off before the first main switch is turned off, within a single switching period of the first main switch, and wherein the second auxiliary switch performs a second switching operation of being turned on before the second main switch is turned on, and turned off before the second main switch is turned off, within a single switching period of the second main switch.

10. The power factor correction device of claim 9, wherein the first diode and the second diode are fast recovery diodes.

11. The power factor correction device of claim 9, wherein the first switch and the second switch comprises one of an insulated gate bipolar transistor (IGBT), a metal oxide semiconductor field-effect transistor (MOS-FET), and a bipolar junction transistor (BJT), respectively.

12. A power factor correction device comprising:
a main switching unit switching AC power from a power input unit to regulate a phase difference between a current and a voltage of the AC power;
an auxiliary switching unit switched on before the main switching unit is switched on, to form a transmission path for surplus power of the main switching unit;
an inductor unit accumulating or discharging energy according to a switching operation of the main switching unit; and
an auxiliary inductor unit regulating an amount of current flowing in the auxiliary switching unit according to a switching operation of the auxiliary switching unit, wherein the main switching unit comprises a first main switch regulating a phase difference between a current and a voltage of the AC power during a positive half cycle of the AC power and a second main switch regulating a phase difference between a current and a voltage of the AC power during a negative half cycle of the AC power, wherein the auxiliary switch comprises a first auxiliary switch and a second auxiliary switch forming a transmission path for surplus power existing before the first main switch and the second main switch are turned on, respectively, wherein the first auxiliary switch performs a first switching operation of being turned on before the first main switch is turned on, and turned off before the first main switch is turned off, within a single switching period of the first main switch, and wherein the second auxiliary switch performs a second switching operation of being turned on before the second main switch is turned on, and turned off before the second main switch is turned off, within a single switching period of the second main switch.

13. The power factor correction device of claim 12, wherein the inductor unit comprises:
a first inductor connected between a first input line of the power input unit and the first main switch; and
a second inductor connected between a second input line of the power input unit and the second main switch.

14. The power factor correction device of claim 13, wherein the auxiliary inductor unit comprises:
a first auxiliary inductor disposed between a connection terminal between the first main switch and the first inductor and the first auxiliary switch; and
a second auxiliary inductor disposed between a connection terminal between the second main switch and the second inductor and the second auxiliary switch.

15. The power factor correction device of claim 13, further comprising a diode unit providing a transmission path for power discharged from the inductor unit according to a switching operation of the main switching unit.

16. The power factor correction device of claim 15, wherein the diode unit comprises:
a first diode providing a transmission path for power discharged from the first inductor according to a switching operation of the first main switch; and
a second diode providing a transmission path for power discharged from the second inductor according to a switching operation of the second main switch.

* * * * *